(12) United States Patent
Tucker

(10) Patent No.: US 11,745,756 B2
(45) Date of Patent: Sep. 5, 2023

(54) TRACK ASSISTANT

(71) Applicant: McLaren Automotive Limited, Surrey (GB)

(72) Inventor: Stephen Gordon David Tucker, Surrey (GB)

(73) Assignee: MCLAREN AUTOMOTIVE LIMITED, Woking (GB)

( * ) Notice: Subject to any disclaimer, the term of this patent is extended or adjusted under 35 U.S.C. 154(b) by 127 days.

(21) Appl. No.: 17/162,964

(22) Filed: Jan. 29, 2021

(65) Prior Publication Data
US 2021/0237760 A1 Aug. 5, 2021

(30) Foreign Application Priority Data

Jan. 31, 2020 (GB) ..................................... 2001389

(51) Int. Cl.
*B60W 50/16* (2020.01)
*B60W 50/14* (2020.01)

(52) U.S. Cl.
CPC ....... *B60W 50/16* (2013.01); *B60W 2050/143* (2013.01); *B60W 2050/146* (2013.01);
(Continued)

(58) Field of Classification Search
CPC ........... B60W 50/16; B60W 2050/143; B60W 2050/146; B60W 2520/10;
(Continued)

(56) References Cited

U.S. PATENT DOCUMENTS 9,475,494 B1 * 10/2016 MacArthur ........... B60W 50/14
10,289,120 B2 * 5/2019 Ueda ..................... G05D 1/024
(Continued)

FOREIGN PATENT DOCUMENTS

CN 109878512 A 1/2019
EP 3078559 A1 10/2016
(Continued)

OTHER PUBLICATIONS

Search Report from Great Britain Patent Application No. 2001389. 2, dated May 14, 2021.
(Continued)

*Primary Examiner* — Jason Holloway
*Assistant Examiner* — Madison B Emmett
(74) *Attorney, Agent, or Firm* — DERGOSITS & NOAH LLP

(57) ABSTRACT

A system and method for assisting a driver in controlling a vehicle, the vehicle comprising one or more driver controls, the method comprising determining an optimal path for the vehicle; determining, based on the current motion of the vehicle and a current setting of one or more driver controls, a predicted path of the vehicle; determining if there is a difference between the optimal path for the vehicle and the predicted path of the vehicle; and if it is determined that there is a difference between the optimal path and the predicted path, delivering haptic and non-haptic feedback to the driver of the vehicle, the feedback comprising an indication that the driver should alter the current setting of one or more driver controls, wherein alteration of the setting of one or more driver controls modifies the motion of the vehicle to reduce the difference.

13 Claims, 6 Drawing Sheets

(52) U.S. Cl.
CPC ..... *B60W 2520/10* (2013.01); *B60W 2520/12* (2013.01); *B60W 2552/30* (2020.02)

(58) Field of Classification Search
CPC ......... B60W 2520/12; B60W 2552/30; B60W 30/045; B60W 2520/105; B60W 2540/10; B60W 2540/16; B60W 2720/10; B60W 30/02; B60W 50/0097; B60W 50/14; B60W 2720/106; B60W 50/08; B60W 30/10; B60W 30/12; B60W 30/18; B60W 30/18163; B60W 50/085
See application file for complete search history.

(56) References Cited

U.S. PATENT DOCUMENTS

| 2010/0228427 | A1* | 9/2010 | Anderson | G05D 1/0088 |
| | | | | 701/1 |
| 2014/0214322 | A1* | 7/2014 | Tsimhoni | G01C 21/3484 |
| | | | | 701/534 |
| 2014/0244157 | A1* | 8/2014 | Tan | G08G 1/167 |
| | | | | 701/423 |
| 2015/0258996 | A1* | 9/2015 | Victor | B60W 40/09 |
| | | | | 340/576 |
| 2017/0039870 | A1* | 2/2017 | Ellis | G01S 19/19 |
| 2019/0152476 | A1* | 5/2019 | Hajika | B62D 6/003 |
| 2019/0265727 | A1 | 8/2019 | Suzuki et al. | |
| 2019/0283779 | A1 | 9/2019 | Sohoni et al. | |
| 2020/0039559 | A1* | 2/2020 | Aerts | H03K 17/962 |
| 2020/0128902 | A1* | 4/2020 | Brown | A42B 3/042 |
| 2020/0164897 | A1* | 5/2020 | Krome | B60W 50/0098 |
| 2020/0184849 | A1* | 6/2020 | Spence | B60W 40/114 |
| 2020/0387156 | A1* | 12/2020 | Xu | G05B 13/0265 |

FOREIGN PATENT DOCUMENTS

| GB | 2528079 A | 1/2016 |
| JP | 2019043195 A | 3/2019 |

OTHER PUBLICATIONS

Search Report from Great Britain Patent Application No. 2001389.2, dated Jul. 20, 2020.
GB2001389.2 Patents Act 1977: Examination Report under Section 18(3), UKIPO, dated Jan. 30, 2023.

* cited by examiner

TRACK ASSISTANT

CROSS-REFERENCE TO RELATED APPLICATIONS

The present Application claims the benefit of Great Britain Patent Application No. 2001389.2, entitled "TRACK ASSISTANT," filed on Jan. 31, 2020, the contents of which are hereby incorporated by reference.

TECHNICAL FIELD

This invention relates to a system and method for assisting the driver of a vehicle on a track, the track assistant system being configured for and the method including delivering haptic and non-haptic feedback to the driver.

BACKGROUND

Given performance trends of modern supercars it can be expected that the gap between a driver's best lap time and that of an optimal lap time will increase. Virtual driving coaches have been introduced which help improve the driver's performance and can be used in situations where real coaches are unavailable. Virtual driving coaches may also be used in conjunction with a real driving coach.

Known virtual coaching systems commonly provide information to the driver using visual methods, for example using outputs such as warning lights or visual displays. Other known systems deliver feedback using acoustic methods, for example voice instruction output though a speaker.

In order for such systems to ensure the safety of the driver, it is important to deliver feedback to the driver in a way which does not overwhelm the driver's senses and negatively affect their performance. Providing too much information to a single sense of the driver has a negative impact on the driver's cognitive load.

It would therefore be desirable to develop an improved method for assisting a driver of a vehicle, where the method includes delivering feedback to the driver so as not to overwhelm the driver's senses.

The driver's cognitive load is likely to be at its highest while the driver is performing a manoeuvre, for example turning a corner.

It would therefore also be desirable to develop a method for delivering feedback to a driver of a vehicle approaching a manoeuvre, where the method minimises the amount of information delivered while the driver is performing a manoeuvre, so as to avoid overwhelming the driver.

SUMMARY OF THE INVENTION

According to a first aspect of the present invention there is provided a method for assisting a driver in controlling a vehicle, the vehicle comprising one or more driver controls, the method comprising determining an optimal path for the vehicle; determining, based on the current motion of the vehicle and a current setting of one or more driver controls, a predicted path of the vehicle; determining if there is a difference between the optimal path for the vehicle and the predicted path of the vehicle; and if it is determined that there is a difference between the optimal path and the predicted path, delivering haptic and non-haptic feedback to the driver of the vehicle, the feedback comprising an indication that the driver should alter the current setting of one or more driver controls, wherein alteration of the setting of one or more driver controls modifies the motion of the vehicle to reduce the difference.

The optimal path may comprise information about vehicle position, velocity and acceleration.

The vehicle may comprise one or more of a steering wheel, a seat, a gear stick, a brake pedal and an accelerator pedal and the haptic feedback is delivered to the driver via one or more of the steering wheel, seat, gear stick, brake pedal and accelerator pedal.

The driver controls may comprise the steering wheel, brake pedal, accelerator pedal and gear stick.

The non-haptic feedback may comprise visual feedback.

The visual feedback may be delivered to the driver via an augmented reality headset.

The non-haptic feedback may comprise auditory feedback.

According to a second aspect of the present invention there is provided a method for delivering auditory feedback to a driver of a vehicle approaching performing a manoeuvre, the method comprising predicting a time period before the driver performs the manoeuvre during which auditory feedback can be delivered to the driver; determining an amount of feedback about the manoeuvre; selecting an optimal amount of feedback to deliver to the driver based on the predicted time period; and delivering the optimal amount of auditory feedback to the driver during that period.

If it is determined that the time period before the driver performs the manoeuvre is greater than a predetermined threshold value, auditory feedback may not be delivered to the driver.

Predicting the time period before the manoeuvre during which auditory feedback can be delivered to the driver may comprise predicting the start time of the manoeuvre.

Predicting the start time of the manoeuvre may comprise determining an optimal path for the vehicle and a start time of the manoeuvre for the optimal path; determining, based on the current motion of the vehicle and a current setting of one or more driver controls, a predicted path of the vehicle; calculating a scaling between the optimal path and predicted path; and applying the scaling to the determined start time to predict the start time of the manoeuvre for the predicted path.

The manoeuvre of the optimal path may be a corner comprising a corner apex and determining the start time of the manoeuvre for the optimal path may comprise: determining a maximum corner velocity at the corner apex of the optimal path; calculating a braking threshold velocity at which the driver must start braking in order to reach the maximum corner velocity at the corner apex; and determining a time at which the vehicle following the optimal path reaches the braking threshold velocity.

Predicting the duration of the time period during which auditory feedback can be delivered to a driver may comprise determining, based on the current motion of the vehicle, the time between the current time and the predicted start time of the manoeuvre for the predicted path.

The duration of the time period during which auditory feedback can be delivered to the driver may be continuously updated based on the current motion of the vehicle and the time passed since the previous determination.

Selecting the optimal amount of feedback to deliver to the driver may comprise ranking the feedback and selecting only the most highly ranked feedback.

Delivering the optimal amount of auditory feedback to the driver may comprise delivering auditory feedback comprising the most highly ranked feedback, the auditory feedback having a duration less than or equal to the predicted time period during which auditory feedback can be delivered.

Selecting the optimal amount of feedback to deliver to the driver may comprise assigning a weighting to each piece of feedback of the determined amount of feedback.

Assigning a weighting may comprise assigning a weighting according to a plurality of parameters.

Ranking the feedback may comprise ranking the feedback according to a chosen parameter of the plurality of parameters.

Selecting only the most highly ranked feedback may comprise selecting only the pieces of feedback which have been assigned the highest weighting according the chosen parameter.

Delivering the optimal amount of auditory feedback to the driver may comprise determining a measure of the cognitive state of the driver and using the measure to determine the optimal amount of auditory feedback to be delivered to the driver.

The auditory feedback may be delivered by predicting a time period before the driver performs the manoeuvre during which auditory feedback can be delivered to the driver; determining an amount of feedback about the manoeuvre; selecting an optimal amount of feedback to deliver to the driver based on the predicted time period; and delivering the optimal amount of auditory feedback to the driver during that period.

The vehicle may be driven in an environment and determining a predicted path of the vehicle is based on the current motion of the vehicle and information about the environment.

The information about the environment may comprise one or more of road condition, humidity, congestion and precipitation.

The optimal path for the vehicle may be determined using information about the environment.

The motion of the vehicle may comprise one or more of position, velocity, acceleration, wheel position, tyre grip, gear setting and applied braking force.

The optimal path for the vehicle may be based on a recorded path of a vehicle.

The optimal path for the vehicle may be based on a calculated virtual path.

According to a third aspect of the present invention there is provided a system for assisting a driver in controlling a vehicle on a track, the vehicle comprising one or more driver controls, the system being configured to: determine an optimal path for the vehicle; determine, based on the current motion of the vehicle and a current setting of one or more driver controls, a predicted path of the vehicle; determine if there is a difference between the optimal path for the vehicle and the predicted path of the vehicle; and if it is determined that there is a difference between the optimal path and the predicted path, deliver haptic and non-haptic feedback to the driver of the vehicle, the feedback comprising an indication that the driver should alter the current setting of one or more driver controls, wherein alteration of the setting of one or more driver controls modifies the motion of the vehicle to reduce the difference.

According to a fourth aspect of the current invention, there is provided a system for delivering auditory feedback to a driver of a vehicle approaching performing a manoeuvre, the system being configured to predict a time period before the driver performs the manoeuvre during which auditory feedback can be delivered to the driver; determine an amount of feedback about the manoeuvre; select an optimal amount of feedback to deliver to the driver based on the predicted time period; and deliver the optimal amount of auditory feedback to the driver during that period.

DETAILED DESCRIPTION OF THE DRAWINGS

Figure 1:
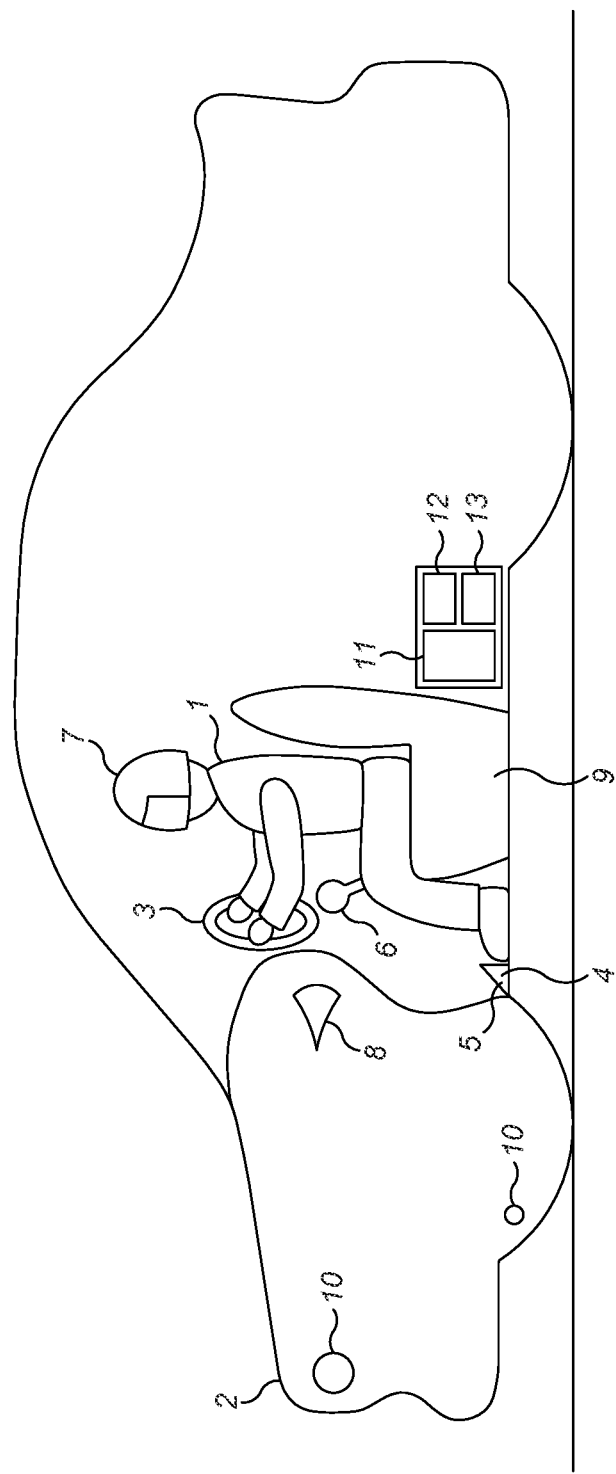
FIG. 1 shows a vehicle and driver viewed from the side.
Figure 2:
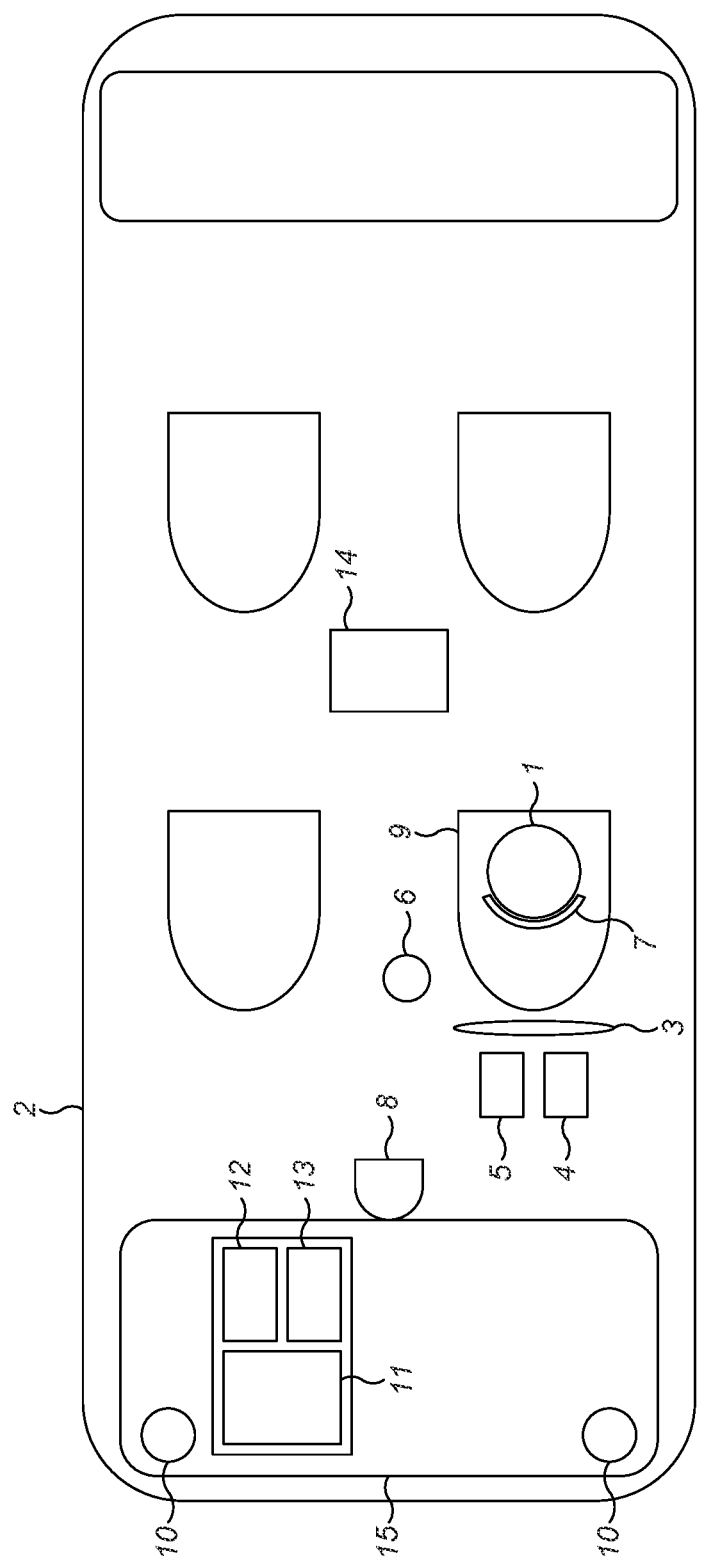
FIG. 2 shows a vehicle and driver viewed from above.

FIGS. 1 and 2 show a driver 1 of a vehicle 2 sitting in a seat 9 and wearing an augmented reality headset 7. The driver may control the motion of the vehicle using one or more driver controls. The driver controls may comprise steering wheel 3, brake pedal 4, accelerator pedal 5 and gear selector 6.

The vehicle 2 may comprise an internal combustion engine, shown generally at 14. Thus, the vehicle 2 may be a mid-engined or rear-engined vehicle. This is because it means that the nose region can be free from engine related components or alternatively at least free from any large engine related components such as radiators. The vehicle 2 may be a hybrid vehicle and so comprise at least one electric motor providing motive power to the vehicle together with an internal combustion engine. The vehicle 2 may be an electric vehicle and so derive motive power solely from electric motors.

The vehicle may further comprise a track assistant system 15. The track assistant system may comprise multiple components. The track assistant system may comprise a processor 11, positioning system 12 and memory storage unit 13. The vehicle may further comprise one or more sensors 10. It will be understood that the specific positions of each element of vehicle 2 is not essential to this invention. For example, in the vehicle 2 shown in FIG. 2, the track assistant system components are located at the front of the vehicle but in the example shown in FIG. 1, the track assistant components are located towards the rear of the vehicle. In other examples, they may be positioned elsewhere in the vehicle.

The track assistant system may be a part of a more general vehicle control unit. The control unit may comprise more than one processor and more than one memory. The memory stores a set of program instructions that are executable by the processor, and reference data such as look-up tables that can be referenced by the processor in response to those instructions. The processor may be configured to operate in accordance with a computer program stored in non-transitory form on a machine readable storage medium. The computer program may store instructions for causing the processor to perform operations in the manner described herein. Alternatively, the processor may be configured to receive instructions from a remote server. The processor may also be configured to send information to a remote server. In this case, the processing may be performed by a remote server.

Figure 3:
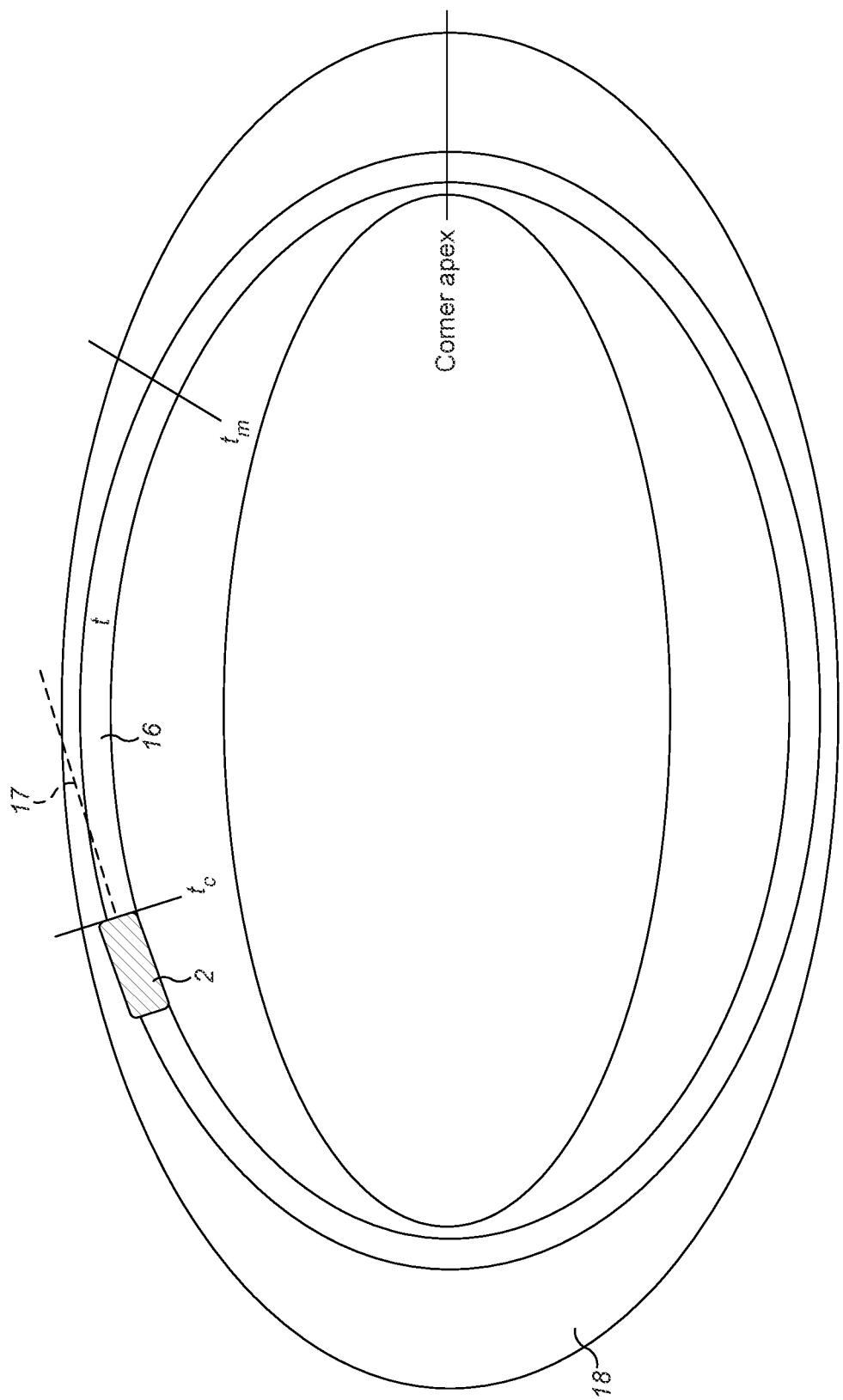
FIG. 3 shows a vehicle travelling around a track.

FIG. 3 shows a vehicle 2 travelling around a track 18. In this example, the track has the shape of a ring. In other examples, the track may have a different shape. In the following description, the vehicle will be described as travelling along a track, but it will be clear that in other examples, the vehicle may be a vehicle travelling along a road.

FIG. 3 shows an optimal path 16 around a track 18. The optimal path may comprise a route that should be followed by a vehicle in order for the vehicle to complete one circuit of the track in the minimum possible time. The optimal path may be the route that should be followed by a vehicle travelling around a track to finish travelling around the track in the minimum possible time. According to other examples, where the track is not a loop, but a path between two points, the optimal path may be the route that should be followed by a vehicle between the two points to get from one point to the other in the minimum possible time. The optimal path may thus comprise information about when the driver should alter the position of the steering wheel. As well as a route, the optimal path may also comprise a speed profile associated with the route. For example, the speed profile of the optimal path may comprise information about when a driver following the optimal path should be travelling at certain speeds and when the driver should accelerate and decelerate. The optimal path therefore may comprise information about acceleration and deceleration. The optimal path may comprise information about when the driver should change gear. The optimal path may be determined based on the shape of the track. The optimal path may be determined based on information about the track environment. Information about the track environment may comprise information about one or more of track condition, humidity, congestion and precipitation. Track condition may include the amount of wear on the track surface. Information about the track environment may additionally include information about obstacles. For example, for a vehicle travelling on a track, obstacles may include other vehicles. The optimal path may be adapted such that collisions with other vehicles can be avoided.

Information about the track environment may be obtained by sensors 10, seen in FIGS. 1 and 2. Sensors 10 may be configured to obtain information about the environment in which vehicle 2 is travelling. Sensors may be configured to generate a map of the track environment. Sensors may be positioned anywhere on the body of the vehicle. Sensors may be positioned on one or more wheels of the vehicle. Sensors positioned on one or more wheels of the vehicle may be used to obtain information about the track surface. Sensors may include cameras, radar and lidar systems. Sensors may be used to detect and locate obstacles positioned on the track. Sensors may be used to obtain information about the level of congestion on the track. For example, a camera may be positioned on the body of the vehicle, facing the direction of travel of the vehicle. Image analysis may be performed on images produced by the camera to detect obstacles. Image analysis may be used to determine information about a congestion level. Lidar sensors may be used to determine a distance between the vehicle and a detected obstacle.

The optimal path may further be determined based on information about the vehicle travelling around the track, for example the type of vehicle and tyre grip of the vehicle. Information about the type of vehicle is stored by the vehicle. Information about tyre grip may be stored by the vehicle and/or may be sensed by sensors 10. Sensors may be positioned on one or more tyres of the vehicle, as seen in FIG. 1. For example, the value of tyre grip stored by the vehicle may be updated according to estimated values of tyre grip based on information taken from sensors and known information about the vehicle. The optimal path may be determined based on the current motion of the vehicle. The current motion of the vehicle may comprise one or more of position, velocity and acceleration. Velocity and acceleration may comprise linear or angular velocity and linear or angular acceleration. The current motion of the vehicle may be determined by positioning system 12. The positioning system 12 may be configured to determine the exact position of the vehicle 2. The positioning system may utilise a global navigation satellite system (GNSS) to determine the vehicle's position. For example, the positioning system may utilise GPS. The positioning system may also utilise sensors 10 to determine the vehicle's position, for example cameras, lidar and radar. Sensors may also comprise inertial measurement units, wheel speed sensors and damper displacement sensors. Velocity and acceleration of the vehicle may be determined by sensors. Sensors may include odometers and accelerometers. Velocity and acceleration may be derived from vehicle odometry. Velocity and acceleration may be determined by visual odometry. For example, visual odometry may be performed using the output of sensors 10 where the sensors are cameras. Velocity and acceleration may be derived from the vehicle's position. Acceleration may be derived from the vehicle's velocity. In one example, the positioning system may employ detection technologies such as lidar or radar. In another example, the positioning system may use cameras. Information obtained using sensors may be combined with known information about the vehicle model to more accurately determine information about the vehicle's position, velocity and acceleration.

The optimal path may also be determined based on the current settings of the driver controls. The driver controls may comprise steering wheel 3, brake pedal 4, accelerator pedal 5 and gear selector 6. Settings of driver controls may comprise one or more of steering wheel position, gear setting, applied driving force and applied braking force. The optimal path may be determined by processor 11.

In this way, the optimal path may be continuously updated as the vehicle progresses around the track. Information about previous and current motion of the vehicle may be stored by the memory storage unit 13. The optimal path may be based on previous motion of the vehicle. Previous motion of the vehicle may include information about grip. For example, a 1D or 2D map of grip of the track may be generated. The optimal path may thus be generated differently based on the earlier progression of the vehicle around the track. As the optimal path 16 seen in FIG. 3 is determined based on the current motion and driver control settings of the vehicle, for a vehicle having an alternative position to that seen in FIG. 3, a different optimal path would be determined.

The optimal path may be based on a recorded path of a vehicle. The optimal path may be based on a recorded path of a particular type of vehicle. Alternatively, the optimal path may be based on a calculated virtual path. The optimal path may be based on a recorded or calculated virtual path and refined using the current motion and driver control settings of the vehicle. Driver control settings may include a user setting. A user setting may dictate a difficultly level. For example, the user may select a "beginner mode", and the optimal path may be adapted according to the selected mode.

Figure 4:
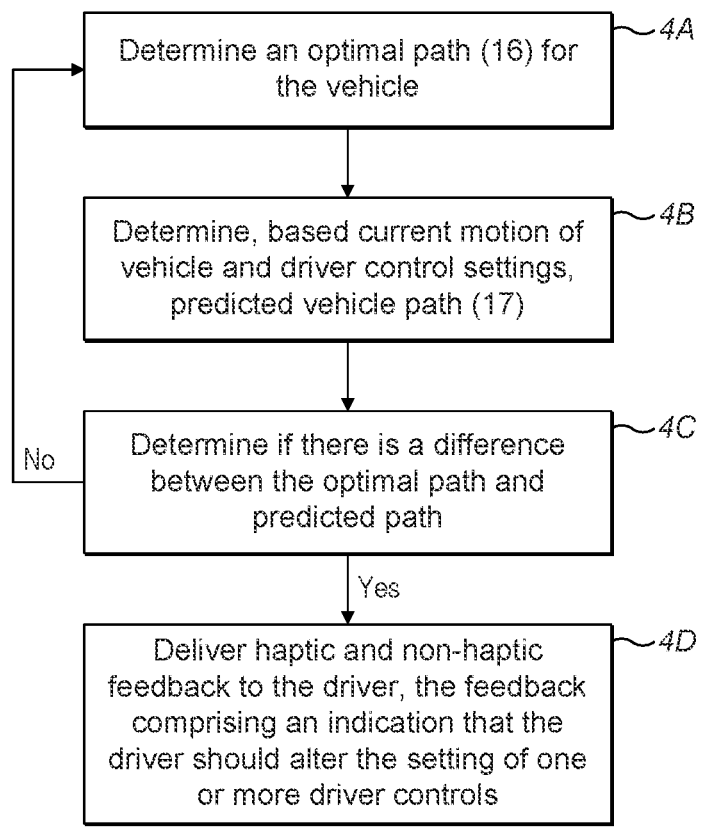
FIG. 4 shows a method for assisting a driver in controlling a vehicle's motion.

The track assistant system is configured to deliver feedback to the driver of the vehicle in order to assist the driver with following the determined optimal path. Following the determined optimal path may include following the speed profile of the optimal path. Following the determined optimal path may include adhering to information about when the driver should change gear The method followed by the track assistant system to deliver feedback to the driver is illustrated in FIG. 4. The first step of the method (Step 4A) comprises determining an optimal path for the vehicle.

The method further comprises determining a predicted path of the vehicle (Step 4B). The predicted path 17 of vehicle 2 is shown in FIG. 3. The predicted path is determined based on the current motion of the vehicle and the current setting of one or more of the driver controls.

The current motion of the vehicle may comprise one or more of position, velocity and acceleration of the vehicle and may be determined using vehicle odometry and/or visual odometry, as described above. The predicted path therefore comprises information about predicted vehicle velocity and acceleration, as well as position. Information about previous and current motion of the vehicle may be stored by the memory storage unit. The predicted path may be determined by processor 11.

The predicted path may comprise the path the vehicle would take if the vehicle continued with the current settings of driver controls. Settings of driver controls may comprise one or more of steering wheel position/steering angle, gear setting, applied driving force and applied braking force including torque request. Determining a predicted path may be based on the particular vehicle model with the current driver control settings. Determining a predicted path may further be based on the vehicle's slip angle. The predicted path further comprises information about the predicted velocity and acceleration of the vehicle. For example, the predicted path may comprise information about direction, speed and acceleration. In the example shown in FIG. 3, the predicted path 17 is a straight line from the front of vehicle 2. It is thus assumed that the steering wheel must be in a straight position.

Determining a predicted path of the vehicle may also be based on information about the track environment. Information about the track environment may comprise information about one or more of track condition, humidity, congestion and precipitation. Track condition may include the amount of wear on the track surface. Information about the track environment may additionally include information about obstacles. Information about the track environment may be obtained by sensors 10 as explained above.

The method shown in FIG. 4 further comprises determining if there is a difference between the optimal path and the predicted path (Step 4C). Processor 11 may be configured to determine if there is a difference between the optimal path and the predicted path. As the predicted path and optimal paths both comprise information about vehicle speed as well as direction, the difference may also comprise a difference in speed. In this way, a difference between the optimal path and predicted path may be determined if they follow the same route but have different speed profiles.

If it is determined that there is a difference between the optimal path and the predicted path, the method further comprises delivering haptic and non-haptic feedback to the driver of the vehicle (Step 4D). If no difference is determined, step 4D is not carried out and steps 4A-4C are repeated.

The difference may be required to be above a threshold value in order for step 4D of the method to be performed. For example, no feedback may be delivered if there is only a negligible difference between the optimal and predicted paths. In order for feedback to be delivered to the driver, the difference between the optimal and predicted paths may be required to be a minimum percentage change of the optimal path. The difference between the optimal and predicted paths may be required to be a minimum percentage change of the predicted path.

The feedback comprises an indication that the driver should alter the current setting of one or more driver controls. The alteration of the setting of the one or more driver controls modifies the motion of the vehicle and reduces the difference between the optimal path and the vehicle's predicted path. Receiving the feedback thus assists the driver in adhering as closely as possible to the optimal path.

Feedback may be provided in advance of the driver performing a certain manoeuvre. According to other examples, feedback relating to a particular manoeuvre may be delivered after the driver has performed the manoeuvre. For example, the feedback may take into account the driver's performance of the manoeuvre. The feedback may comprise advice for the next time the driver performs the same manoeuvre, for example on a subsequent lap. The feedback may be delivered before the same manoeuvre (for example, corner) on a subsequent lap.

Step 4D comprises delivering haptic and non-haptic feedback.

A system which uses only one method for providing feedback will always be limited in the quantity of information it can provide. Providing feedback to the driver using a number of outputs means that more information can be provided across the multiple outputs without overloading the driver's cognitive load.

The present solution provides a method which comprises delivering feedback haptically, for example through vibration of a steering wheel as well as non-haptically, for example acoustically though a speaker 8. The quantity of information that can be delivered to the driver without overloading a single sense is therefore increased.

Haptic feedback may be any type of feedback which can be perceived by the driver by touch. Haptic feedback may be delivered to the driver via one or more of the steering wheel, seat, gear selector, brake pedal and accelerator pedal. Haptic feedback may be delivered to the driver via a wearable device such as a haptic suit, gloves, a helmet, hat or glasses. The haptic feedback may comprise a vibration or buzz. The haptic feedback may comprise any other feedback which the driver can feel.

For example, if in Step 4C it is determined that there is a difference between the predicted path of the vehicle and the optimal path, and that the difference is that the predicted path is on the left of the optimal path, haptic feedback may be delivered to the driver which indicates to the driver that they should angle the steering wheel to the right (turn the steering wheel clockwise). In this example, the haptic feedback may comprise vibration of the steering wheel at a position where the driver's right hand is located.

Alternatively, if it is determined that there is a difference between the predicted path of the vehicle and the optimal path, and that the difference is that the predicted path is on the right of the optimal path, haptic feedback may be delivered to the driver which indicates to the driver that they should angle the steering wheel to the left (turn the steering wheel anticlockwise). In this example, the haptic feedback may comprise vibration of the steering wheel at a position where the driver's left hand is located.

In another example, where it is determined that the difference between the predicted path and the optimal path is that the vehicle following the predicted path is travelling more slowly than a vehicle following the optimal path, the haptic feedback may comprise vibration of the accelerator pedal which provides an indication to the driver that they should apply more pressure to the accelerator pedal in order to increase the vehicle speed to adhere more closely to the optimal path. Feedback may also be provided as a visual cue to increase the vehicle speed.

In a further example, where it is determined that the difference between the predicted path and the optimal path is that the vehicle following the predicted path is travelling more quickly than a vehicle following the optimal path, the haptic feedback may comprise vibration of the accelerator pedal which provides an indication to the driver that they should apply less pressure to the accelerator pedal. In this example, the feedback may be an indication that the driver should control the vehicle to slow down.

In a final example, where it is determined that the difference between the predicted path and the optimal path is that the vehicle following the predicted path is travelling in a lower gear than a vehicle following the optimal path, the haptic feedback may comprise vibration of the gear stick. Delivering this feedback provides an indication to the driver that they should change up a gear so that the vehicle adheres more closely to the optimal path. Feedback may also be provided as a visual cue to change gear.

Delivering haptic feedback may take into account the force applied by the driver to the driver control via which haptic feedback is to be delivered. The force applied by the driver may be how strongly the driver is gripping the driver control. The force applied by the driver to driver controls may differ for different controls. For example, the force applied by the driver to the brake pedal may be higher than that applied to the steering wheel. The method may therefore further include delivering haptic feedback via a driver control which is tailored to that particular control. In an example where haptic feedback is a vibration of the driver control, the vibration delivered via the brake pedal may be stronger than the vibration that would be delivered via the steering wheel.

In this way, haptic feedback may be delivered so that the driver understands what they should be sensing whilst not corrupting the feel of the relevant driver control. The driver may feel the haptic feedback, but the driver's ability to control the vehicle using the driver control is not disrupted.

Non-haptic feedback may comprise visual or auditory feedback, or any other type of feedback which generally cannot be perceived by touch. Visual feedback may be delivered to the driver via the augmented reality headset 7 seen in FIGS. 1 and 2. Alternatively, visual feedback may be delivered on another display or using lights. Auditory feedback may be delivered to the driver via a speaker 8. In other examples, auditory feedback may be delivered to the driver via a headset. Augmented reality headset 7 may be configured to deliver auditory feedback to the driver. For example, the augmented reality headset may comprise headphones. Auditory feedback may comprise voice instruction. Voice instruction may be provided through a text to speech algorithm. In other examples, auditory feedback may comprise other sounds which provide the driver with an indication that the they should alter the current setting of one or more driver controls.

The track assistant system is configured to deliver auditory feedback to the driver to assist the driver with controlling a vehicle during a manoeuvre. The manoeuvre may comprise any event which requires the driver to alter a setting of one or more driver controls, for example applying the brakes or turning a corner. Auditory feedback may comprise language-based coaching. For example, the feedback may be delivered prior to a manoeuvre and comprise directions. The feedback may be delivered after a manoeuvre and comprise feedback intended to guide the driver next time the manoeuvre must be performed.

Auditory feedback may comprise indicative sounds. For example, auditory feedback may comprise percussive sounds, warning sounds or other non-language-based sounds.

The driver's cognitive load is likely to be at its highest as the driver is performing a manoeuvre, for example whilst the vehicle is turning a corner. It is therefore beneficial for a track assistant system to minimise the amount of information delivered while the driver is performing a manoeuvre to avoid overwhelming the driver. The present solution provides a method which predicts the time at which the driver will start to perform a manoeuvre and delivers feedback prior to the driver starting to perform the manoeuvre.

The method includes calculating a time period before the manoeuvre during which feedback may be usefully provided to the driver. The calculated time period is continually updated according to the vehicle's current motion and predicted path. The method further comprises calculating the optimal amount of feedback to deliver to the driver during this period prior to the manoeuvre. This method has the advantage over systems which use only current vehicle speed to determine when to provide feedback as such systems may overestimate or underestimate the time during which they can give the feedback. This can result in either a lack of information, information being delivered during high cognitive loading periods or information that is delivered too late.

Figure 6:
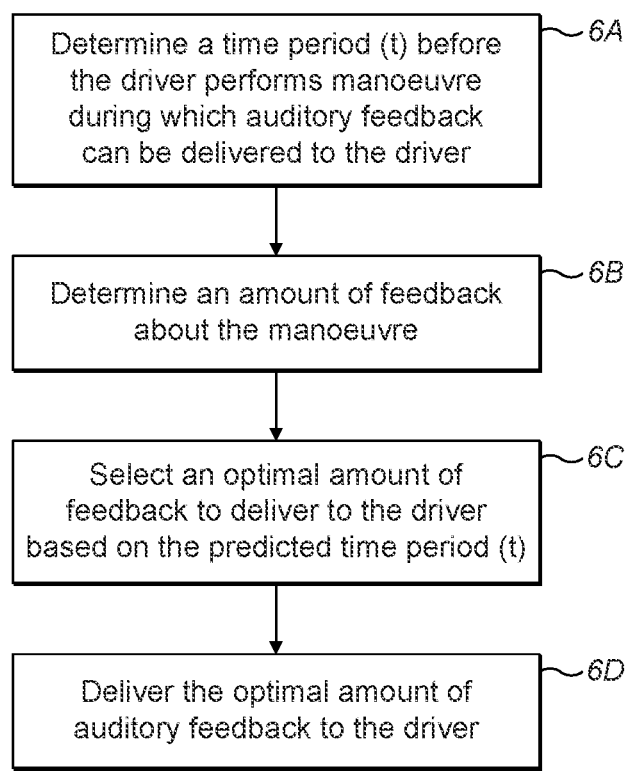
FIG. 6 shows a method for delivering auditory feedback to a driver of a vehicle approaching a manoeuvre.

The track assistant system is configured to perform a method for delivering the optimal amount of auditory feedback to the driver prior to the driver performing a manoeuvre, as shown in FIG. 6.

The method comprises determining a time period t before the driver performs the manoeuvre during which auditory feedback can be delivered to the driver (Step 6A); determining an amount of feedback about the manoeuvre (Step 6B); selecting an optimal amount of feedback to deliver to the driver based on the predicted time period (Step 6C); and delivering the optimal amount of auditory feedback to the driver (6D).

Figure 5:
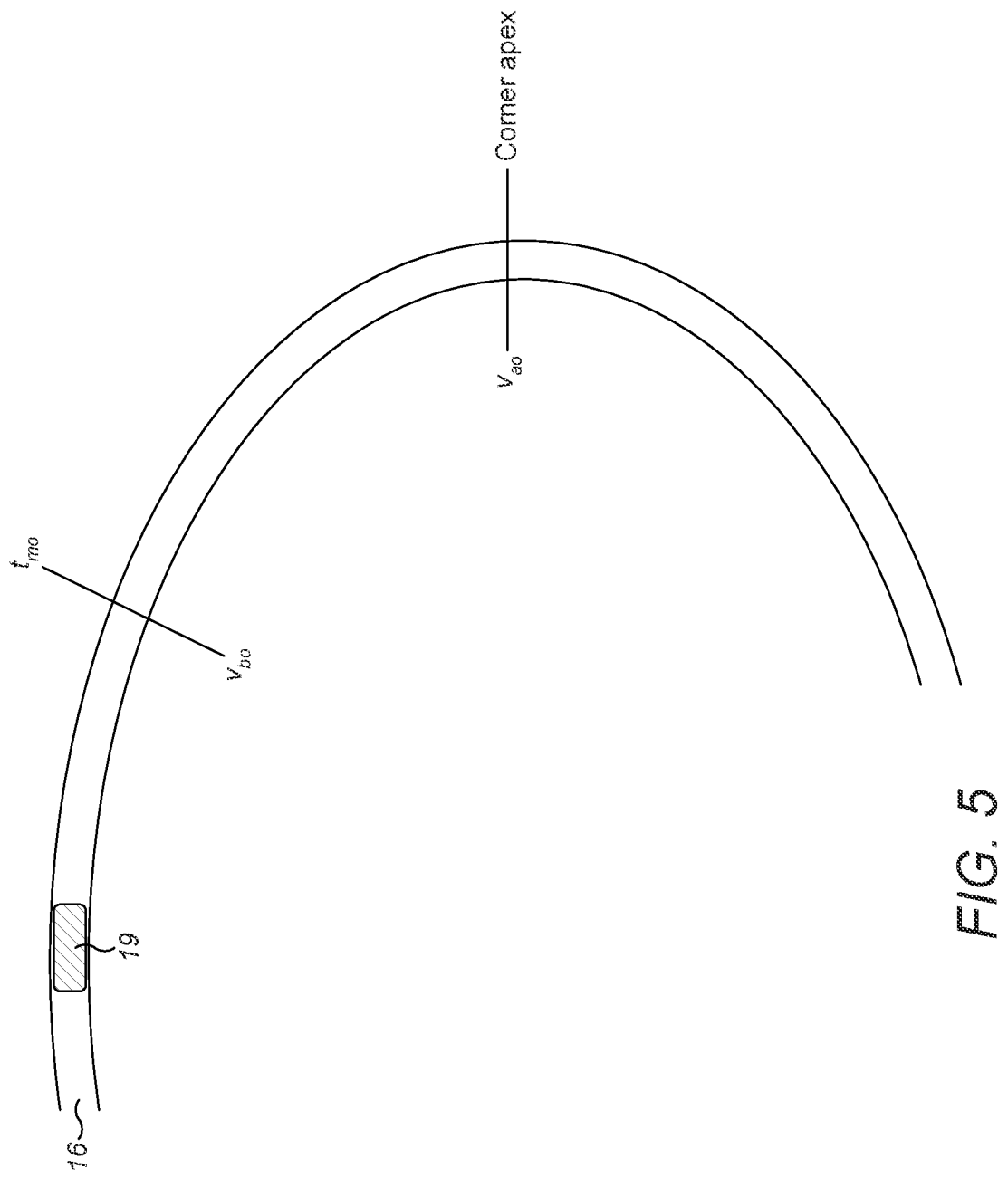
FIG. 5 shows a vehicle following an optimal path.

Determining a time period t before the driver of a vehicle 2 (seen in FIG. 3) performs a manoeuvre and during which auditory feedback can be delivered to the driver (Step 6A) may comprise performing calculations relating to a vehicle taking an optimal path. FIG. 5 shows a vehicle 19 following an optimal path 16. As shown in FIG. 5, vehicle 19 is approaching a manoeuvre. In this example, the manoeuvre is a corner.

As shown in FIG. 3 and Table 1 below, time period t may be defined as the time period between the current time $t_c$ and the time at which the driver of vehicle 2 will start performing the manoeuvre $t_m$.

TABLE 1

| Path | Predicted Path | Optimal Path |
| --- | --- | --- |
| Current time | $t_c$ | $t_{co}$ |
| Manoeuvre start time | $t_m$ | $t_{mo}$ |
| Time period to deliver feedback | $t = t_m - t_c$ | $t_o = t_{mo} - t_{co}$ |

The method for determining time period t may comprise determining a time $t_{mo}$ at which the driver of a vehicle 19 following the optimal path 16 would start performing the manoeuvre. FIG. 5 shows the corner of the optimal path 16 having a corner apex. Determining the start time of the manoeuvre for the optimal path $t_{mo}$ may comprise determining a maximum velocity $v_{ao}$ at which the vehicle may travel at the corner apex. The maximum velocity $v_{ao}$ may be the largest velocity at which the vehicle can travel at the corner apex and successfully perform the manoeuvre i.e. turn the corner. The maximum velocity $v_{ao}$ may be the largest velocity at which the vehicle can travel at the corner apex and remain on the optimal path. Determining the start time of the manoeuvre for the optimal path $t_{mo}$ may further comprise calculating a braking threshold velocity $v_{bo}$. The braking threshold velocity $v_{bo}$ may be the velocity at which the driver of the vehicle 19 following the optimal path 16 should start braking in order that the vehicle does not exceed the maximum velocity $v_{ao}$ when the vehicle reaches the corner apex. Determining the start time of the manoeuvre for the optimal path $t_{mo}$ may therefore comprise determining the time at which the driver reaches the braking threshold velocity $v_{bo}$. The start time of the manoeuvre for the optimal path $t_{mo}$ may comprise the time at which the driver of the vehicle following the optimal path must start braking on the approach to the manoeuvre.

Determining a time period t during which auditory feedback can be delivered to the driver of vehicle 2 (Step 6A) may comprise determining a predicted path 17 of the vehicle (seen in FIG. 3). The predicted path is determined based on the current motion of the vehicle and a current setting of one or more driver controls. Determining time period t may comprise calculating a scaling k between the optimal path 16 and predicted path 17. Time period t may be defined as the time period between the current time $t_c$ and the time at which the driver of vehicle 2 will start performing the manoeuvre $t_m$. The time at which the driver of vehicle 2 will start performing the manoeuvre $t_m$ may be predicted by comparing vehicle 2 travelling on its predicted path and vehicle 19 travelling on the optimal path 16. The time at which the driver of vehicle 2 will start performing the manoeuvre $t_m$ may be calculated by applying the scaling k to the determined manoeuvre start time of the optimal path $t_{mo}$. For example, $t_m = k \, t_{mo}$.

Scaling k may be a scalar or a vector value. For example, if the optimal path and predicted path are the same except that the optimal path has a speed profile that is twice that of the predicted path, scaling k may have a value of 2. Where the paths differ in direction, scaling k may be a vector. Scaling k may be calculated as a moving average of the predicted path relative to the optimal path. Scaling k may thus be calculated as a moving average of the driver's performance relative to the vehicle maximum performance.

As shown in Table 1, determining a time period t during which auditory feedback can be delivered to the driver (Step 6A) may then comprise determining a difference between the predicted start time of the manoeuvre $t_m$ and the current time L. Time period t determined may thus be continuously updated as the vehicle's predicted path changes (based on the current motion of the vehicle and a current setting of one or more driver controls). As time period t is also dependent on the current time $t_c$, t may also be continuously updated in view of the time passed since the previous determination.

When a vehicle is travelling along a track but is not approaching a manoeuvre, for example, the vehicle may be travelling along a straight section of the track, it may not yet be appropriate to deliver feedback about an upcoming manoeuvre to the driver. This may be because the driver may be thinking about the straight section of track and thus providing manoeuvre feedback may cause confusion. Providing manoeuvre feedback too far in advance of the vehicle reaching the manoeuvre may mean that the information is forgotten before the manoeuvre is reached. The method of FIG. 6 may only be performed when the vehicle is approaching a manoeuvre. The method shown in FIG. 6 may thus comprise an additional step of determining whether time period t is less than a threshold value and only delivering feedback to the driver if the time period t is less than a threshold value. When the time period t is determined to be equal to or less than the threshold value (in step 6A), steps 6B-6D may then be performed and feedback delivered to the driver. If the time period t is determined to be greater than a threshold value, step 6D may not be performed.

The method for delivering auditory feedback to the driver of the vehicle approaching a manoeuvre further comprises determining an amount of feedback about the manoeuvre (Step 6B). Feedback comprises an indication that the driver should alter a setting of one or more driver controls. Feedback may therefore comprise instructions. For example, feedback may include the voice instruction, "increase pressure on the accelerator pedal" or "angle the steering wheel to the left". Feedback comprising instructions may be determined based on a comparison between the predicted path and the optimal path. Feedback may be determined so as to assist the drive of the vehicle with adhering to the optimal path. Feedback about the manoeuvre may further comprise information that does not provide any instruction to the driver. Feedback may comprise information to describe the manoeuvre. For example, if the manoeuvre is a corner, feedback about the manoeuvre may comprise information about any of the dimensions of the corner, hazards, incline of the track and condition of the track surface. Feedback may be determined based on input from sensors 10 on the vehicle. For example, image analysis may be performed on images obtained from cameras to determine the dimensions of the corner. Input from sensors on wheels of the vehicle may be used to determine information about the condition of the track surface.

The method for delivering auditory feedback to the driver of a vehicle approaching a manoeuvre further comprises selecting an optimal amount of feedback to deliver to the driver based on the predicted time period t (Step 6C) and delivering the optimal amount of auditory feedback to the driver during that period (Step 6D). Selecting an optimal amount of feedback to deliver to the driver may comprise ranking all feedback determined about the manoeuvre and selecting only the most highly ranked feedback to deliver.

Selecting the optimal amount of feedback to deliver to the driver may comprise assigning a weighting to the feedback. Each piece of feedback determined in Step 6B may be assigned a weighting. Each piece of feedback may be assigned a weighting according to a plurality of parameters. The weightings assigned to each piece of feedback may be used to rank the feedback. The feedback may be ranked using the weighting according to chosen parameter. For example, the chosen parameter may be importance to the driver and so feedback may be ranked according to its importance to the driver. Pieces of feedback assigned a higher weighting according to this parameter are deemed to be more important to the driver. Alternatively, feedback may be assigned weighting according to urgency and may be ranked according to urgency.

Delivering the optimal amount of auditory feedback to the driver may comprise selecting only the most highly ranked feedback and delivering only the most highly ranked feedback to the driver. According to the example in which pieces of feedback are assigned a weighting according to importance to the driver, the method may comprise ranking the pieces of feedback according to their weighting and selecting only ten pieces of feedback having the highest weighting to deliver to the driver. Delivering the optimal amount of auditory feedback to the driver may comprise delivering the maximum amount of feedback which may be delivered during the predicted time period t. Therefore, in another example, more or fewer than ten pieces of feedback may be selected to deliver to the driver. Delivering the optimal amount of auditory feedback to the driver may comprise determining the lowest ranked feedback that can be delivered during the predicted time period t. Delivering the optimal amount of auditory feedback to the driver may comprise delivering the most highly ranked feedback, the feedback having a duration less than or equal to the predicted time period t during which auditory feedback can be delivered to the driver.

FIGS. 5 and 6 relate to an example in which feedback is delivered to a driver approaching a manoeuvre. According to other examples, feedback relating to a particular manoeuvre may be delivered after the driver has performed the manoeuvre. For example, the feedback may take into account the driver's performance of the manoeuvre. The feedback may comprise advice for the next time the driver performs the same manoeuvre, for example on a subsequent lap. The feedback may be delivered before the same manoeuvre (for example, corner) on a subsequent lap.

Delivering the optimal amount of auditory feedback to the driver may additionally take into account the driver's cognitive state. This may be achieved by monitoring the driver's past performance, particularly the driver's response to receiving feedback, and assigning a cognitive state scaling to the driver. The scaling of cognitive state for the driver may be calculated relative to other drivers. In this way, the amount of feedback delivered can be adjusted for the cognitive state of the particular driver.

The driver of the vehicle may additionally interact with the track assistant system. The track assistant system may be configured such that the driver can interact with the system using multiple input mechanisms. Input mechanisms may include voice input, HMI and physical gestures. The driver may interact with the system to request feedback at any time. The driver may request additional feedback. Additional feedback may supplement feedback already provided using the methods of FIGS. 5 and 6. This has the advantage of meaning that the system provides excellent levels of on-the fly-configurability. The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method for assisting a driver in controlling a vehicle approaching performing a maneuver, the vehicle comprising one or more driver controls and a seat, the driver controls comprising a steering wheel, brake pedal, accelerator pedal and gear stick, the method comprising:
   determining an optimal path for the vehicle;
   determining, based on the current motion of the vehicle and a current setting of one or more driver controls, a predicted path of the vehicle;
   determining if there is a difference between the optimal path for the vehicle and the predicted path of the vehicle; and
   when it is determined that there is a difference between the optimal path and the predicted path, delivering haptic and non-haptic feedback to the driver of the vehicle, the feedback comprising an indication that the driver should alter the current setting of one or more driver controls, wherein;
     alteration of the setting of one or more driver controls modifies the motion of the vehicle to reduce the difference;
     the haptic feedback is delivered to the driver via one or both of the one or more driver controls or the seat; and
     the non-haptic feedback comprises auditory feedback delivered via a speaker to the driver according to a method comprising:
     predicting a time period before the driver performs the maneuver during which auditory feedback can be delivered to the driver, wherein predicting the time period during which auditory feedback can be delivered to a driver comprises:
       calculating a predicted start time of the maneuver based on the vehicle's current motion, a current setting of one or more driver controls, and a calculated scaling between the optimal path and the predicted path; and
       determining, the time between the current time and the predicted start time of the maneuver for the predicted path;
     determining an amount of feedback about the maneuver;
     selecting an optimal amount of feedback to deliver to the driver based on the predicted time period; and
     delivering the optimal amount of auditory feedback via a speaker to the driver during that period, wherein selecting the optimal amount of feedback to deliver to the driver comprises:
       assigning a weighting according to a plurality of parameters to each piece of feedback of the determined amount of feedback;
       ranking the feedback according to a chosen parameter of the plurality of parameters, and
       selecting only the pieces of feedback which have been assigned the highest weighting according to the chosen parameter.

2. The method of claim 1, wherein the non-haptic feedback comprises visual feedback.

3. The method of claim 2, wherein the visual feedback is delivered to the driver via an augmented reality headset.

4. The method of claim 1, wherein if it is determined that the time period before the driver performs the maneuver is greater than a predetermined threshold value, auditory feedback is not delivered to the driver.

5. The method of claim 1, wherein the maneuver of the optimal path is a corner comprising a corner apex and determining the start time of the maneuver for the optimal path comprises:
   determining a maximum corner velocity at the corner apex of the optimal path;
   calculating a braking threshold velocity at which the driver must start braking in order to reach the maximum corner velocity at the corner apex; and
   determining a time at which the vehicle following the optimal path reaches the braking threshold velocity.

6. The method of claim 1, wherein the duration of the time period during which auditory feedback can be delivered to the driver is continuously updated based on the current motion of the vehicle and the time passed since the previous determination.

7. The method of claim 1, wherein delivering the optimal amount of auditory feedback to the driver comprises delivering auditory feedback comprising the most highly ranked feedback, the auditory feedback having a duration less than or equal to the predicted time period during which auditory feedback can be delivered.

8. The method of claim 1, wherein delivering the optimal amount of auditory feedback to the driver comprises determining a measure of the cognitive state of the driver and using the measure to determine the optimal amount of auditory feedback to be delivered to the driver.

9. The method of claim 1, wherein delivering the optimal amount of auditory feedback to the driver comprises delivering the maximum amount of feedback which may be delivered during the predicted time period.

10. A system for assisting a driver in controlling a vehicle approaching performing a maneuver on a track, the vehicle comprising one or more driver controls and a seat, the driver controls comprising a steering wheel, brake pedal, accelerator pedal and gear stick, the system being configured to:
 determine an optimal path for the vehicle;
 determine, based on the current motion of the vehicle and a current setting of one or more driver controls, a predicted path of the vehicle;
 determine if there is a difference between the optimal path for the vehicle and the predicted path of the vehicle; and
 when it is determined that there is a difference between the optimal path and the predicted path, deliver haptic and non-haptic feedback to the driver of the vehicle, the feedback comprising an indication that the driver should alter the current setting of one or more driver controls such that alteration of the setting of one or more driver controls modifies the motion of the vehicle to reduce the difference, wherein the system is configured to:
  deliver the haptic feedback to the driver via one or both of the one or more driver controls or the seat; and
  deliver the non-haptic feedback to the driver as auditory feedback via a speaker according to a method comprising:
 predicting a time period before the driver performs the maneuver during which auditory feedback can be delivered to the driver, wherein predicting the time period during which auditory feedback can be delivered to a driver comprises:
  calculating a predicted start time of a maneuver based on the vehicle's current motion, a current setting of one or more driver controls, and a calculated scaling between the optimal path and the predicted path:
  determining, the time between the current time and the predicted start time of the maneuver for the predicted path;
 determining an amount of feedback about the maneuver;
 selecting an optimal amount of feedback to deliver to the driver based on the predicted time period; and
 delivering the optimal amount of auditory feedback via a speaker to the driver during that period, wherein selecting the optimal amount of feedback to deliver to the driver comprises:
  assigning a weighting according to a plurality of parameters to each piece of feedback of the determined amount of feedback;
  ranking the feedback according to a chosen parameter of the plurality of parameters; and
  selecting only the pieces of feedback which have been assigned the highest weighting according to the chosen parameter.

11. The system of claim 10, wherein the system is configured such that the driver can interact with the system using multiple input mechanisms to request additional feedback.

12. The system of claim 10, wherein the system is configured such that the delivered auditory feedback has a duration less than or equal to the predicted time period during which auditory feedback can be delivered.

13. A method for assisting a driver in controlling a vehicle approaching performing a maneuver, the vehicle comprising one or more driver controls a seat, the driver controls comprising a steering wheel, a gear stick, a brake pedal and an accelerator pedal, the method comprising:
 determining an optimal path for the vehicle;
 determining, based on the current motion of the vehicle and a current setting of one or more driver controls, a predicted path of the vehicle;
 determining if there is a difference between the optimal path for the vehicle and the predicted path of the vehicle; and,
 when it is determined that there is a difference between the optimal path and the predicted path, delivering haptic and non-haptic feedback to the driver of the vehicle, the feedback comprising an indication that the driver should alter the current setting of one or more driver controls, wherein:
  alteration of the setting of one or more driver controls modifies the motion of the vehicle to reduce the difference;
  the haptic feedback is delivered to the driver via the one or more driver controls and/or the one or more; and
  the non-haptic feedback comprises auditory feedback delivered via speaker to the driver according to a method comprising:
 predicting a time period before the driver performs a maneuver during which auditory feedback can be delivered to the driver;
 determining an amount of feedback about the maneuver;
 calculating the optimal amount of the determined feedback to deliver based on the predicted time period;
 selecting the optimal amount of feedback from the determined feedback to deliver to the driver based on the predicted time period, wherein selecting the optimal amount of feedback to deliver to the driver comprises:
  assigning a weighting according to a plurality of parameters to each piece of feedback of the determined amount of feedback;
  ranking the feedback according to a chosen parameter of the plurality of parameters; and
  selecting only the pieces of feedback which have been assigned the highest weighting according to the chosen parameter; and
 delivering the selected optimal amount of auditory feedback via a speaker to the driver during that period, such that the delivered auditory feedback has a duration less than or equal to the predicted time period during which auditory feedback can be delivered.

* * * * *